United States Patent
Wampula et al.

(10) Patent No.: US 7,185,893 B2
(45) Date of Patent: Mar. 6, 2007

(54) METALLIC FLAT SEAL AND METHOD FOR THE PRODUCTION THEREOF

(75) Inventors: Torsten Wampula, Ulm (DE); Josef Ludwig, Niederstotzingen (DE); Alfred Weiss, Neu-Ulm (DE); Gunther Unseld, Neenstetten (DE); Matthias Laske, Ulm (DE); Friedrich Dillenz, Blaustein-Herrlingen (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/250,621

(22) PCT Filed: Jan. 17, 2002

(86) PCT No.: PCT/EP02/00427

§ 371 (c)(1), (2), (4) Date: Oct. 29, 2003

(87) PCT Pub. No.: WO02/057667

PCT Pub. Date: Jul. 25, 2002

(65) Prior Publication Data

US 2004/0070153 A1   Apr. 15, 2004

(30) Foreign Application Priority Data

Jan. 19, 2001 (DE) ................ 101 02 288

(51) Int. Cl.
*F02F 11/00* (2006.01)

(52) U.S. Cl. .............. 277/317; 277/318; 277/319; 277/592; 277/593

(58) Field of Classification Search ........ 277/317–321, 277/592, 593, 594, 595
See application file for complete search history.

(56) References Cited

U.S. PATENT DOCUMENTS

| | | | | |
|---|---|---|---|---|
| 2,152,630 A | * | 4/1939 | Balfe | 277/594 |
| 2,681,241 A | * | 6/1954 | Aukers | 277/596 |
| 3,655,210 A | * | 4/1972 | Farnam et al. | 277/592 |
| 3,811,689 A | * | 5/1974 | Farnam | 277/637 |

(Continued)

FOREIGN PATENT DOCUMENTS

DE  41 01 871 A1   7/1992

(Continued)

OTHER PUBLICATIONS

Derwent English Abstract for DE 41 01 871 A1.

(Continued)

*Primary Examiner*—Alison K. Pickard
(74) *Attorney, Agent, or Firm*—Rader, Fishman & Grauer PLLC

(57) ABSTRACT

The present invention concerns a metallic flat gasket with at least one sealing layer with at least one port, with a sensor layer corresponding to the ports being deposited on at least one surface of the sealing layer. This sensor layer consists of a compression protection layer and at least one break, in which a sensor element is at least partially installed.

54 Claims, 4 Drawing Sheets

U.S. PATENT DOCUMENTS

| | | | | |
|---|---|---|---|---|
| 4,364,226 | A | * | 12/1982 | Croset et al. ............... 60/276 |
| 4,397,176 | A | * | 8/1983 | Rohde et al. ............. 73/35.07 |
| 4,587,840 | A | | 5/1986 | Dobler et al. |
| 4,676,515 | A | * | 6/1987 | Cobb ....................... 277/592 |
| 5,121,929 | A | * | 6/1992 | Cobb ....................... 277/317 |
| 5,195,365 | A | * | 3/1993 | Chujo et al. ................ 73/115 |
| 5,380,014 | A | * | 1/1995 | Schaperkotter ........... 277/317 |
| 5,609,345 | A | * | 3/1997 | Miura et al. .............. 277/593 |
| 5,659,132 | A | * | 8/1997 | Novak et al. ................ 73/115 |
| 5,725,223 | A | * | 3/1998 | Yamada et al. ........... 277/595 |
| 6,164,662 | A | * | 12/2000 | Uemura et al. ........... 277/593 |
| 6,533,283 | B1 | | 3/2003 | Gottel |
| 6,739,183 | B1 | * | 5/2004 | Kestly ...................... 73/115 |
| 2002/0130468 | A1 | * | 9/2002 | Kawai et al. ............. 277/318 |
| 2006/0017231 | A1 | * | 1/2006 | Rohner et al. ............ 277/317 |

FOREIGN PATENT DOCUMENTS

| | | | |
|---|---|---|---|
| DE | 43 11 838 | A1 | 2/1995 |
| DE | 691 06 081 | T2 | 5/1995 |
| DE | 199 13 092 | C2 | 10/2000 |
| EP | 0 148 321 | B1 | 7/1985 |
| JP | 9-329520 | * | 12/1997 |

OTHER PUBLICATIONS

Derwent English Abstract for DE 43 11 838 A1.
Delphion English Abstract for DE 199 13 092 C2.
Delphion English Abstract for DE 691 06 081 T2.
Delphion English Abstract for EP 0 148 321 B1.
International Search Report, 2 pages.

* cited by examiner

METALLIC FLAT SEAL AND METHOD FOR THE PRODUCTION THEREOF

FIELD OF INVENTION

The invention concerns a metallic flat gasket with at least one sealing layer with at least one port for sealing off two components from each other. Here, a sensor element is integrated in the system, such that it is protected from compression.

BACKGROUND OF THE INVENTION

Metallic sealing systems are used in the automotive industry primarily as cylinder head gaskets. Here, cylinder head gaskets are used to seal off various chambers, such as combustion chambers, coolant and lubricant openings, threaded bolts, as wells as ports for valve control parts, from each other. The requirements on these sealing systems continue to become increasingly rigorous and the recording of measurement data for characteristic parameters of the gasket appears to be desirable. Here, the measurement in the direct vicinity of the corresponding openings enables data recording that is as precise as possible. Due to these requirements on the dimensioning, sensor measurements are coming more and more to the forefront.

The teaching of DE 199 13 092 concerns a cylinder head gasket, on which a sensor device for detecting measurement values is arranged.

However, the disadvantage of the prior art is that the danger of compression of the sensor element is so great that only very robust sensors can be used.

Thus, the problem of the present invention is to devise a metallic sealing system that contains a sensor element that is protected from compression.

SUMMARY OF THE INVENTION

This problem is solved by the generic metallic flat gasket with the features of claim 1 and by the generic production method with the features of claim 20. The additional subordinate claims present advantageous refinements. In the claims 27 and 28, the use of the sealing system is described.

According to the invention, a metallic flat gasket with at least one sealing layer with at least one port is created, with a corresponding sensor layer relative to the ports deposited on at least one surface of the sealing layer, which consists of a compression protection layer with at least one break. Here, the compression protection layer is used to protect the sensor element from mechanical damage and consists of an incompressible material, e.g., high-hardness steel. Here, the sensor element is at least partially installed in the break of the compression protection layer.

In a preferred configuration, the sensor layer is deposited on a separate carrier layer. Thus, the deposition of the sensor layer can be performed independently of the production process of the cylinder head gasket. Simultaneously, the carrier layer can be selected in regard to an optimum adhesive bond between the sensor layer and sealing layer.

Here, the sensor layer can be arranged on one side of the cylinder head gasket facing either the cylinder head or the engine block. Likewise, it is possible for one sensor layer to be deposited on both sides. This allows the arrangement of several sensor elements on both sides of the metallic sealing system. Likewise, the carrier layer can be arranged on one side of the metallic sealing system facing either the cylinder head or the engine block.

In an advantageous refinement, the sensor element is at least partially installed in the carrier layer. Here, e.g., there can also be a break, in which the sensor element can be inserted. Likewise, the carrier layer can also have additional corresponding structures for connection elements to a measurement value detector unit, in addition to the structures for the sensor element. These structures can include lines or contacts. In a similar way, the compression protection layer can also have structures for the connection elements. The advantage of such structures is that, in addition to the sensor element itself, the connection elements can also be protected from compression.

In a preferred configuration, a thermally conductive layer is deposited on the end side of the sensor element facing away from the carrier layer. The thermal conductivity of this layer should be sufficiently high that a nearly error-free temperature measurement can be performed across this thermally conductive layer at the corresponding component. For example, a thermally conductive paste can be used as the thermally conductive layer. It is also preferable if the carrier layer, which faces the engine block and/or the cylinder head, has a high thermal conductivity value.

In a preferred configuration, a layer that protects against mechanical damage is deposited on the side of the sensor element facing away from the carrier layer. This protection layer provides improved protection against compression, and even more protection against wear and tear due to friction.

In an advantageous refinement, the carrier layer is produced from steel, aluminum, and/or other aluminum-containing materials, such as ceramics or enamels. Here, the carrier layer preferably has a layer thickness of less than 300 µm, with a layer thickness of approximately 150 µm being especially preferred.

The compression protection layer, which preferably consists of high-hardness steel, aluminum, and/or other aluminum-containing materials, such as ceramics or enamels, preferably has a layer thickness of less than 300 µm, with a layer thickness of approximately 200 µm being especially preferred. It is also preferred if the compression protection layer is electrically insulated at the end sides of the recess.

In a preferred refinement, the compression protection layer can also have a bead and/or stopper. Here, it is especially preferred if the sensor element is arranged in the direct vicinity of the bead in order to provide additional protection against compression. Likewise, it is possible for the sensor element itself to be stamped as a bead and/or stopper.

Preferably, the sensor element is selected from the group of piezoelectric, piezoresistive, capacitive, magnetic, electromagnetic, DMS [wire strain gauge], eddy current, optical fiber, and micromechanical sensors. The sensor element is preferably designed as a temperature sensor. The use of a resistor sensor as the sensor element in the flat gasket is likewise preferred. Especially preferred is the use of a PTC temperature probe as the sensor element.

According to the invention, a method for producing a single-layer or multi-layer metal gasket with a sensor element is proposed, for which initially a compression protection layer is deposited on the metal gasket with the compression protection layer having at least one break, in whose region the sensor element is attached by means of a frictional connection.

Here, thick-film techniques, such as those known from screen printing, are used as the preferred deposition technique. These techniques can produce a layer thickness of the sensor element in the range around 30 µm.

The sensor element can likewise preferably be deposited using a thin-film technique, which allows a layer thickness of the sensor element of around 1 µM to be realized. The PVD technique is used as the preferred deposition technique.

However, additional options for the frictional connection of the sensor element in the break of the compression protection layer also include conventional frictional connections, such as adhesive bonds, soldering, or locking devices.

A hardened steel, aluminum, and/or other aluminum-containing materials, such as ceramics or enamels, are preferably used for the compression protection layer and the carrier layer.

The flat gasket according to the invention can be used primarily for temperature measurements at combustion chamber openings. However, it can also be used for force, path, expansion, acceleration, and/or pressure measurements at combustion chamber openings.

BRIEF DESCRIPTION OF THE DRAWINGS

With reference to the following figures, the flat gasket according to the invention will be explained with reference to individual examples, without limiting the object according to the invention to these examples.

DETAILED DESCRIPTION OF THE INVENTION

Figure 1:
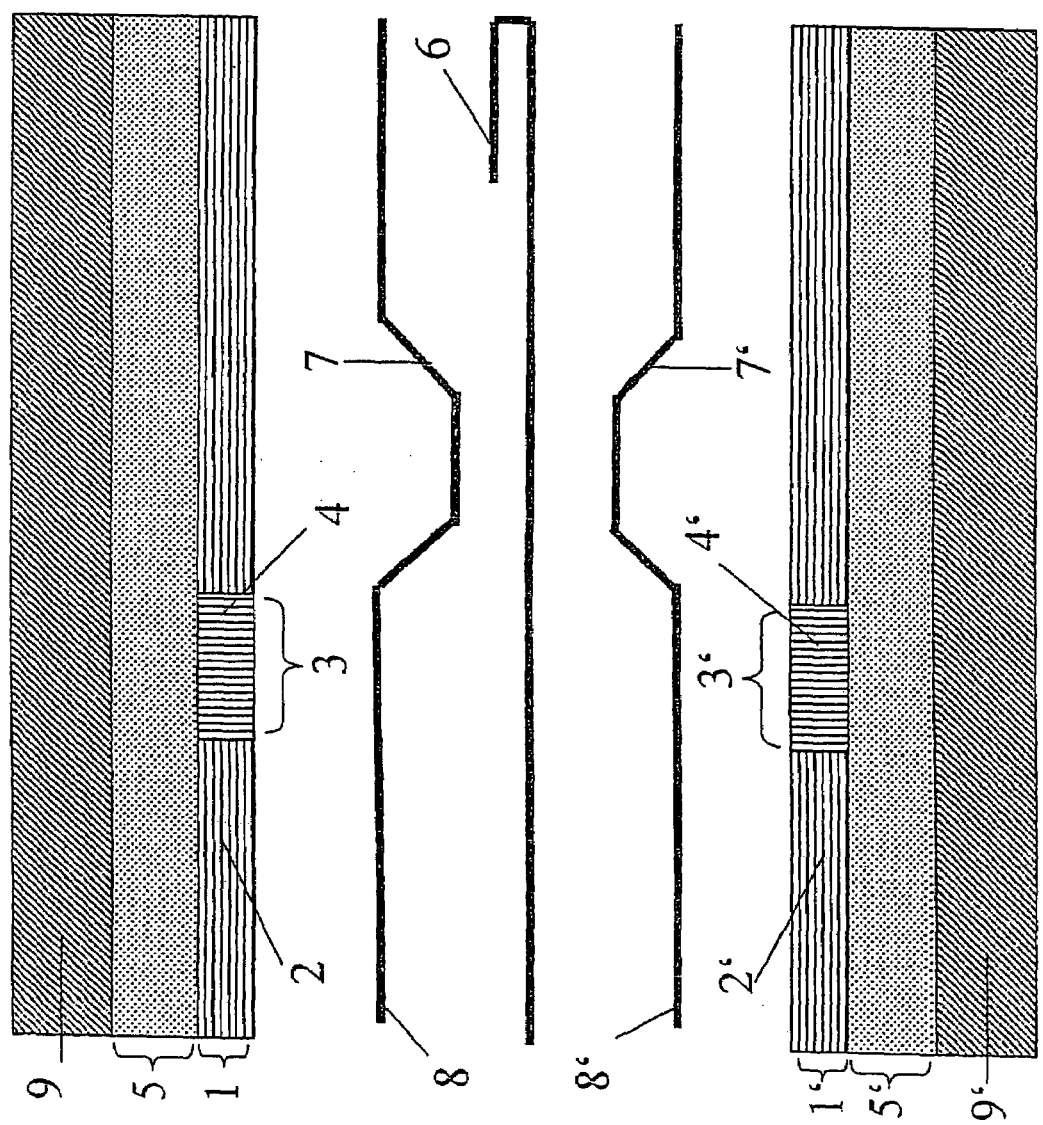
FIG. 1 shows a flat gasket according to the invention in cross section.

FIG. 1 shows a flat gasket in the form of a cylinder head gasket with a stopper 6 and two beads 7, 7'. Connected here on both sides is a sensor layer 1, 1' consisting of the compression protection layers 2, 2' and the sensor elements 4, 4', which are located in a break of the compression protection layer. In this example, the sensor layer has a thickness of 270 µm. On the sides facing away from the gasket layers 8, 8', there is a carrier layer 5, 5', which is in direct contact with the cylinder head 9 or the engine block 10 [sic; 9'] on the sides facing away from the sensor layers. As this drawing shows, it is possible for the sensor and carrier layers to be arranged on the sides facing both the cylinder head and also the engine block. Similarly, it is also possible for a sensor layer to be deposited on only one side of the cylinder head gasket.

Figure 2:
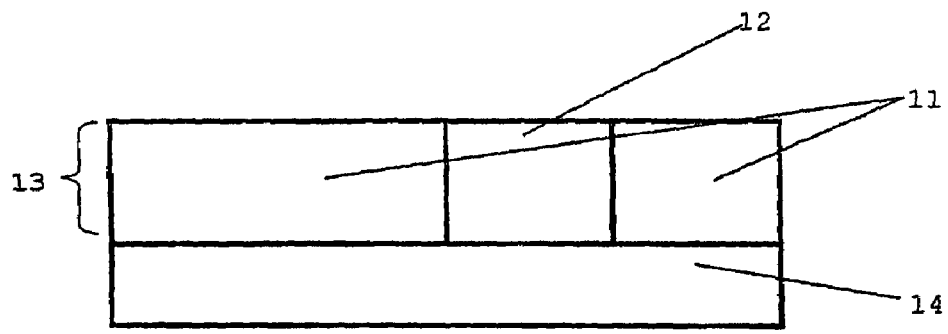
FIGS. 2–10 show various deposition variants of the sensor layer.

FIG. 2 shows the compression protection layer 11 with a break, in which the sensor element 12 is inserted. Simultaneously, this sensor layer 13 is deposited on a carrier layer 14.

Figure 3:
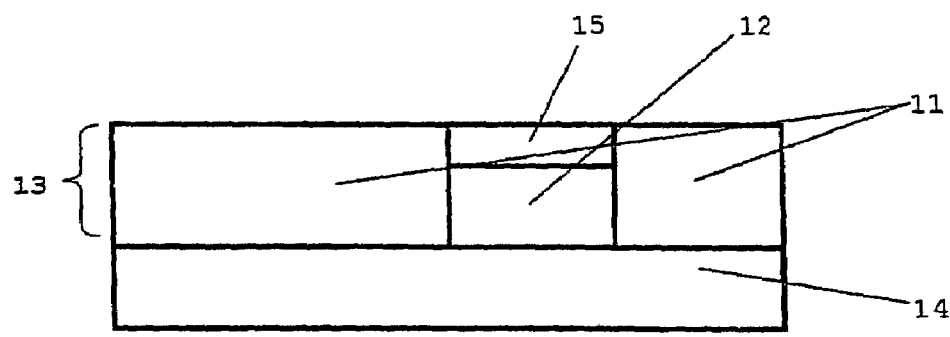

In comparison with FIG. 2, FIG. 3 shows the application of a sensor layer 13 on a carrier layer 14 with the sensor element 12 only partially filling the recess because a thermally conductive layer and/or a layer 15 protecting against mechanical damage is also deposited on the side facing away from the carrier layer 14.

Figure 4:
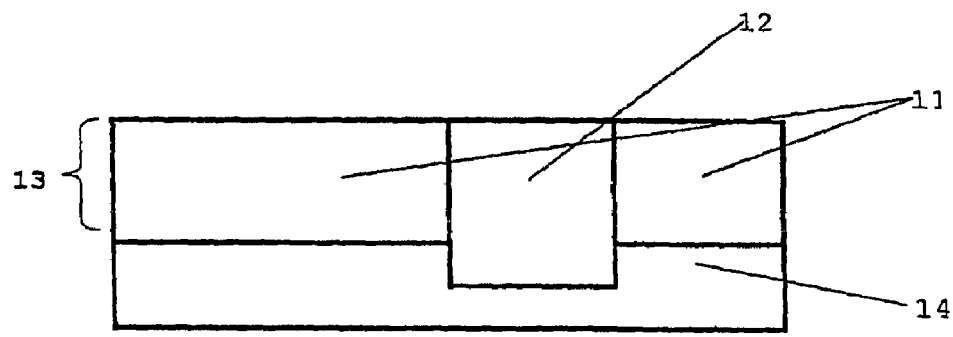

In FIG. 4, the sensor element 12 is designed so that it completely fills the recess of the compression protection layer 11, and, at the same time, extends into the carrier layer 14. Here, the carrier layer 14 has a structure, in which the sensor element 12 is inserted. A frictional connection between the carrier layer 14 and the sensor element 12 is not absolutely necessary.

Figure 5:
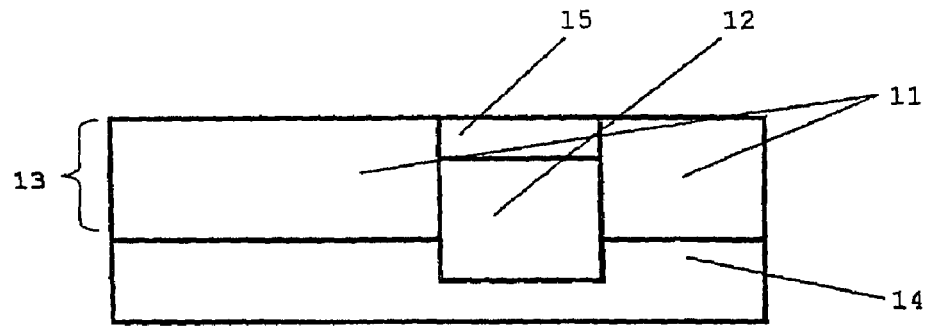

In FIG. 5, the sensor element 12 likewise extends into the carrier layer 14 with a layer 15, which is thermally conductive or which protects against mechanical damage, also deposited on the side of the sensor element facing away from the carrier layer 14. This layer 15 can be applied, e.g., in the form of a paste.

Figure 6:
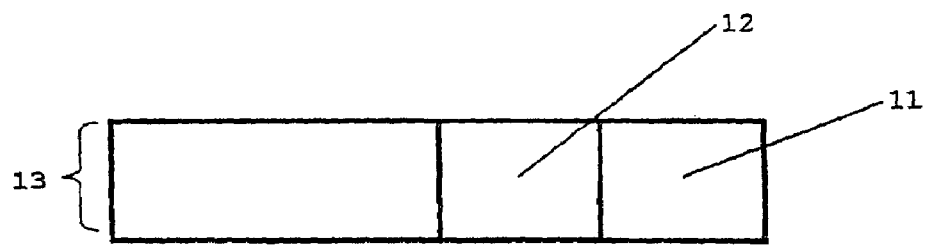

Analogous to FIG. 2, FIG. 6 shows a sensor layer 13 consisting of a compression protection layer 11 with a break, in which a sensor element 12 is inserted. In this case, however, no carrier layer is deposited, so that the sensor 13 is deposited directly on the sealing layer of the cylinder head gasket.

Figure 7:
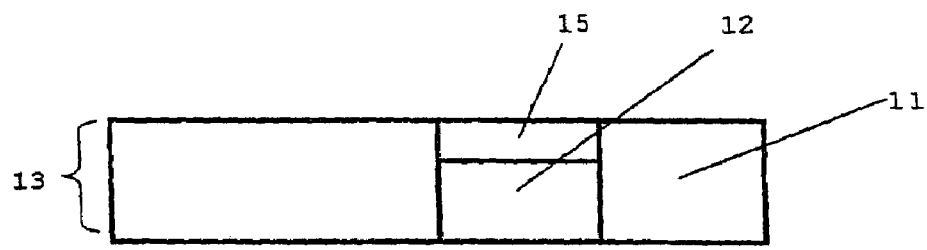

FIG. 7 shows a sensor layer 13 consisting of a compression protection layer 11 with a break, in which a sensor element 12 is attached, which is covered on one side with a layer 15 that is thermally conductive or that protects against mechanical damage.

Figure 8:
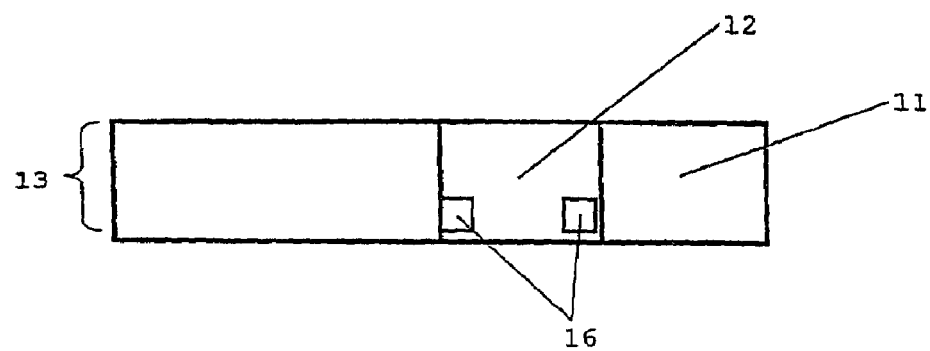

FIG. 8 shows a sensor layer 13 consisting of a compression protection layer 11, with the sensor element 12 here being attached in such a way in the recess of the compression protection layer 10 [sic; 11], such that the sensor element 3 [sic; 12] is locked by means of the sensor socket 16.

Figure 9:
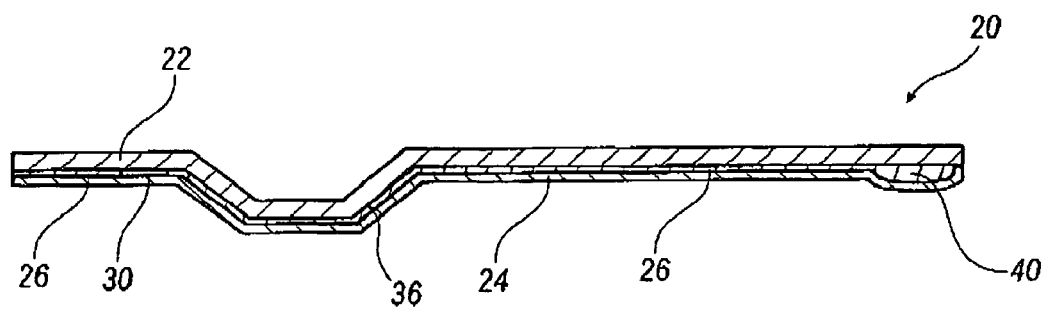

FIG. 9 illustrates a portion of a gasket 20 that includes a sealing layer 22, a carrier layer 24, and a compression protection layer 26 interposed between the sealing layer 22 and the carrier layer 24. Compression protection layer 26 is defined by a break and a sensor layer 30 (not sectioned for clarity) is positioned within the break. Preferably, both compression protection layer 26 and sensor layer 30 are deposited on either sealing layer 22 or carrier layer 24. gasket 20 also includes a bead portion 36 and a stopper portion 40.

Figure 10:
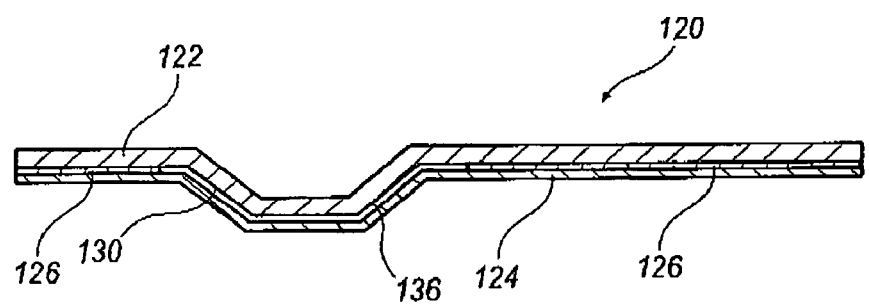

FIG. 10 illustrates a portion of a gasket 120 that includes a sealing layer 122, a carrier layer 124, and a compression protection layer 126 interposed between the sealing layer 122 and the carrier layer 124. Compression protection layer 126 is defined by a break and a sensor layer 130 (not sectioned for clarity) is positioned within the break. Preferably, both compression protection layer 126 and sensor layer 130 are deposited on either sealing layer 122 or carrier layer 124. The gasket 120 also includes a bead portion 136 where the sensor layer 130 is stamped as a bead.

The invention claimed is:

1. A gasket comprising:
   at least one sealing layer having at least one port;
   a sensor layer disposed on a surface of said sealing layer, said sensor layer including a compression protection layer and at least one break, wherein said sensor layer is disposed between said sealing layer and a carrier layer; and
   a sensor element at least partially disposed as a film and at least partially disposed within said break, wherein a thermally conductive layer is disposed on a side surface of said sensor element, said side surface of said sensor element faces away from said carrier layer.

2. The gasket as recited in claim 1, wherein said sensor layer is disposed proximate a cylinder head.

3. The gasket as recited in claim 1, wherein said sensor layer is disposed proximate an engine block.

4. The gasket as recited in claim 1, wherein at least one structure is formed on a surface of said carrier layer facing said sensor element.

5. The gasket as recited in claim 4, wherein said sensor element extends into said structure.

6. The gasket as recited in claim 4, wherein a connection element extends into said structure.

7. The metallic gasket as recited in claim 1, wherein a damage protection layer is disposed on a top surface of said sensor element facing away from said carrier layer.

8. The gasket as recited in claim 1, wherein said carrier layer is formed from one of a steel, aluminum, and an aluminum-containing material including a ceramic and an enamel.

9. The gasket as recited in claim 1, wherein said carrier layer is formed with a thickness not greater than 300 μm.

10. The gasket as recited in claim 1, wherein said carrier layer is formed with a thickness of approximately 150 μm.

11. The gasket as recited in claim 1, wherein said compression protection layer is formed with a thickness not greater than 300 μm.

12. The gasket as recited in claim 1, wherein said compression protection layer is formed with a thickness of approximately 200 μm.

13. The gasket as recited in claim 1, wherein said compression protection layer is formed from one of a steel, an aluminum, and an aluminum-coating material including a ceramic and an enamel.

14. The gasket as recited in claim 1, wherein said compression protection layer is electrically insulated.

15. The gasket as recited in claim 1, wherein said compression protection layer is formed with a bead.

16. The gasket as recited in claim 15, wherein said sensor element is disposed proximate said bead.

17. The gasket as recited in claim 1, wherein said compression protection layer is formed with a stopper.

18. The gasket as recited in claim 1, wherein said sensor element is on of a piezoelectric, piezoresistive, capacitive, magnetic, electromagnetic, DMS, eddy current, optical fiber, and micromechanical sensor.

19. The gasket as recited in claim 1, wherein said sensor element is a thick-film sensor.

20. The gasket as recited in claim 1, wherein said sensor element is a thin-film sensor.

21. The gasket as recited in claim 1, wherein said sensor element is a temperature sensor.

22. The gasket as recited in claim 1, wherein said sensor element is an electrical resistance sensor.

23. The gasket as recited in claim 1, wherein said sensor element is a PTC temperature probe.

24. The gasket of claim 1, further comprising a plurality of sealing layers that selectively seal between the components, wherein said sensor layer is positioned between said sealing layers and one of said components.

25. The gasket of claim 1, further comprising a carrier layer, wherein said sensor layer is deposited on said carrier layer.

26. The gasket as recited in claim 1, wherein a surface of said film is in contact with a surface of said compression protection layer.

27. The gasket as recited in claim 1, wherein said film is completely disposed within said break.

28. A gasket comprising:
  at least one sealing layer having at least one port;
  a sensor layer disposed on a surface of said sealing layer, said sensor layer including a compression protection layer and at least one break, wherein said sensor layer is stamped as a bead; and
  a sensor element at least partially disposed as a film and at least partially disposed within said break, wherein said sensor layer is disposed between said sealing layer and a carrier layer, wherein a thermally conductive layer is disposed on a side surface of said sensor element, said side surface of said sensor element faces away from said carrier layer.

29. The gasket as recited in claim 28, wherein said sensor layer is disposed proximate a cylinder head.

30. The gasket as recited in claim 28, wherein said sensor layer is disposed proximate an engine block.

31. The gasket as recited in claim 28, wherein at least one structure is formed on a surface of said carrier layer facing said sensor element.

32. The gasket as recited in claim 31, wherein said sensor element extends into said structure.

33. The gasket as recited in claim 31, wherein a connection element extends into said structure.

34. The metallic gasket as recited in claim 28, wherein a damage protection layer is disposed on a top surface of said sensor element facing away from said carrier layer.

35. The gasket as recited in claim 28, wherein said carrier layer is formed from one of a steel, aluminum, and an aluminum-containing material including a ceramic and an enamel.

36. The gasket as recited in claim 28, wherein said carrier layer is formed with a thickness not greater than 300 μm.

37. The gasket as recited in claim 28, wherein said carrier layer is formed with a thickness of approximately 150 μm.

38. The gasket as recited in claim 28, wherein said compression protection layer is formed with a thickness not greater than 300 μm.

39. The gasket as recited in claim 28, wherein said compression protection layer is formed with a thickness of approximately 200 μm.

40. The gasket as recited in claim 28, wherein said compression protection layer is formed from one of a steel, an aluminum, and an aluminum-coating material including a ceramic and an enamel.

41. The gasket as recited in claim 28, wherein said compression protection layer is electrically insulated.

42. The gasket as recited in claim 28, wherein said compression protection layer is formed with a bead.

43. The gasket as recited in claim 42, wherein said sensor element is disposed proximate said bead.

44. The gasket as recited in claim 28, wherein said sensor element is one of a piezoelectric, piezoresistive, capacitive, magnetic, electromagnetic, DMS, eddy current, optical fiber, and micromechanical sensor.

45. The gasket as recited in claim 28, wherein said sensor element is a thick-film sensor.

46. The gasket as recited in claim 28, wherein said sensor element is a thin-film sensor.

47. The gasket as recited in claim 28, wherein said sensor element is a temperature sensor.

48. The gasket as recited in claim 28, wherein said sensor element is an electrical resistance sensor.

49. The gasket as recited in claim 28, wherein said sensor element is a PTC temperature probe.

50. The gasket as recited in claim 28, further comprising a plurality of sealing layers that selectively seal between the components, wherein said sensor layer is positioned between said sealing layers and one of said components.

51. The gasket as recited in claim 28, wherein said sensor layer is deposited on said carrier layer.

52. The gasket as recited in claim 28, wherein a surface of said film is in contact with a surface of said compression protection layer.

53. The gasket as recited in claim 28, wherein said film is completely disposed within said break.

54. The gasket as recited in claim 28, wherein said compression protection layer is formed with a stopper.

* * * * *